United States Patent [19]

Greene

[11] Patent Number: 4,725,370

[45] Date of Patent: Feb. 16, 1988

[54] COAL FIRE EXTINGUISHING AND PREVENTION

[75] Inventor: Jay S. Greene, Manheim, Pa.

[73] Assignee: Environmental Security Incorporated, Lancaster, Pa.

[21] Appl. No.: 865,851

[22] Filed: May 22, 1986

Related U.S. Application Data

[63] Continuation-in-part of Ser. No. 744,771, Jun. 14, 1985, and Ser. No. 695,349, Jan. 25, 1985.

[51] Int. Cl.$^4$ .............................................. B01J 13/00

[52] U.S. Cl. ...................................... 252/8.05; 252/2; 252/355; 252/602; 252/7; 169/47; 169/64

[58] Field of Search ...................... 252/355, 8.05, 7, 2, 252/602; 210/749; 169/47, 64; 239/461

[56] References Cited

U.S. PATENT DOCUMENTS 1,908,398 5/1933 Beythein ................................ 252/7

3,637,022 1/1972 Kelly ................................ 252/8.05

4,248,733 2/1981 Stales, Sr. .

*Primary Examiner*—John F. Terapane

*Assistant Examiner*—Susan Wolffe

*Attorney, Agent, or Firm*—Nixon & Vanderhye

[57] ABSTRACT

A method and formulation are provided which are effective for fighting coal fueled fires. The composition puts out the fire, penetrates the burning coal, disperses fire gases, and does not generate any gases that are toxic to humans. The basic formulation comprises a linear alkylbenzolyate sulfonate, non-ionic detergent and lauric superamide detergent mixture comprising about 50% by volume of the formulation, vitamin B-6 in the amount of about 0.5–3% by weight of the detergent mixture, bicarbonate of soda in the amount of about 3–18% by weight of the detergent mixture, red vegetable color in the amount of about 0.25–0.75% by weight of the detergent mixture, eucalyptus oil (if present) in the amount of about 1–2% by weight of the detergent mixture, and water comprising about 37–47% percent by volume of the total formulation. Once the fire has been extinguished, a light is directed to the extinguished area, and red colored light will be reflected off of the extinguished area indicating that it is safe to proceed. The liquid formulation also may be used in a method of absorbing methane and other gases generated by a coal burning fire, or in a method of of retarding spontaneous ignition of coal by spraying it directly onto the coal.

29 Claims, 1 Drawing Figure

COAL FIRE EXTINGUISHING AND PREVENTION

CROSS-REFERENCE TO RELATED APPLICATIONS

This application is a continuation-in-part of co-pending U.S. patent application Ser. Nos. 744,771 filed June 14, 1985, and 695,349 filed Jan. 25. 1985.

BACKGROUND AND SUMMARY OF THE INVENTION

The art recognizes the great difficulties commonly associated with extinguishing coal fueled fires. This is especially so in fires burning in coal mines. Prior to the invention, it was, as a practical matter, almost impossible to extinguish a coal fueled fire in a coal mine once the fire reached significant proportions. Attempts to extinguish such fires with water, or water and foam, are ineffective. The water has insufficient penetration and latent heat evaporazation to effect extinguishment. Foam has no penetrating ability to extinguish deep seated coal fires, it will roll off very hot coal fires, and it can separate into constituents with the acid content of the foam actually fueling the fire, and being burned along with the coal.

In U.S. Pat. No. 4,248,733 a fire extinguishing medium is provided which can be effective for extinguishing coal fires, even though there is no specific disclosure in that patent for extinguishing coal fires. If the composition in said patent is applied to a coal fire, it can be effective in ultimately extinguishing the fire, however it must be applied at a relatively high metering rate with respect to water (e.g. at about a 10–20% dilution rate to water) in order to be effective, has a toxicity problem in that components thereof (particularly the urine and alfalfa) generate gases which are toxic to humans, and does not have a penetration rate that is as high as desired.

According to the present invention a coal fire fighting formulation is provided, as well as a method of fighting coal fires, which overcomes the drawbacks associated with the prior art discussed above. According to the invention it is possible to extinguish coal fueled fires even when there is pyrolysis (the phenomena of the coal having a tendency to self-generate and produce some of its own oxygen to maintain a sustained burn, in limited oxygen atmospheres). This can be accomplished with a relatively low metering rate of the liquid formulation to water, and with no toxicity; that is gases generated are not toxic to humans. Further, according to the present invention the formulation deeply penetrates the coal, resulting in quicker and more effective extinguishment, quicker and more effective absorption of fire gases, and prevention of reignition. For example, in the practice of the present invention, as compared to the application of the formulation of the U.S. Pat. No. 4,248,733 to a coal burning fire, the invention is as effective when metered at about a 6% dilution rate to water as the liquid composition of the patent at a dilution rate of about 10 to 12% to water. The invention also penetrates more quickly, and has zero toxicity, whereas the urine and alfalfa components of the formulation of the patent result in the generation of gases which are toxic to humans. In fact, the formulation according to the invention has been approved by the Bureau of Mines for application to coal burning fires, including in coal mines.

According to the present invention it is also possible to use the formulation at a dilution rate of about 0.25–0.5% to water to absorb methane, and other gases generated by a coal burning fire, merely by spraying the composition in water into the air containing the gases. Also according to the invention it is possible to retard spontaneous ignition of coal by spraying the liquid composition at a dilution rate of about 0.5–1.5% to water, directly onto the coal surface, the retardation of spontaneous ignition lasting almost indefinitely as long as there are no significant increases in temperature or pressure.

The liquid formulation according to the present invention preferably consists essentially of a linear alkylbenzolyate sulfonate, non-ionic detergent and lauric superamide detergent mixture comprising about 50% by volume of the formulation, vitamin B-6 in an amount of about 0.5–3% by weight of the detergent mixture, bicarbonate of soda in the amount of about 3–18% by weight of the detergent mixture, non-toxic coloring and perfuming agents if desired, and water comprising about 37–47% by volume of the total formulation. The detergent mixture itself is most effective when it comprises, by volume: about 10–40% linear alkybenzene sulfonate about 2–12% isooctylphenyl polyethoxyethanol; about 0–5% polyoxyethylene sorbitan monooleate; about 2–10% lauric diethanolamides; about 0–2% monoethanolamide superamides; and about 31–86% water. It is highly desirable to add a non-toxic red dye, such as red vegetable color, to the formulation, in an amount of about 0.25–0.75% by weight of the detergent mixture. The red dye is effective to cause a red colored light reflection off of a surface to which it has been applied when the fire has been extinguished. This red colored light reflection serves as an indication to the firefighters that the fire at that particular surface has been extinguished, and it is safe to proceed further into the mine tunnel or shaft to fight the fire therein.

DETAILED DESCRIPTION OF THE INVENTION

Figure 1:
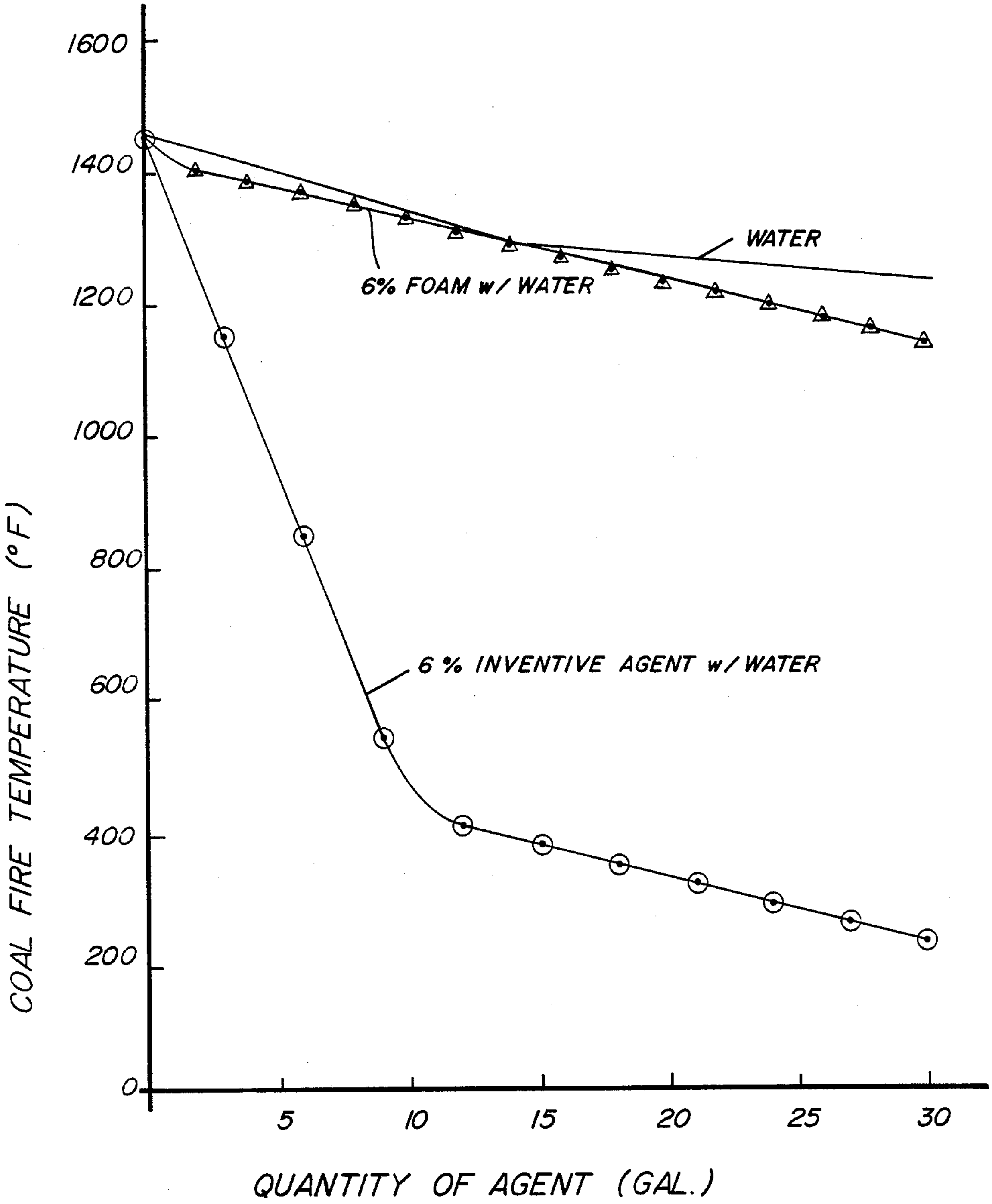
FIG. 1 comprises a graphical representation of the effectiveness of the invention compared to foam with water, and water itself, in fighting coal fueled fires.

According to the present invention a method of extinguishing a coal fire is provided. The method comprises the step of: applying directly to the burning coal a liquid composition containing a detergent mixture of linear alkylbenzolyate sulfonate, non-ionic detergent and lauric superamide and water, with effective amounts of materials for: densifying and increasing the heat absorption capacity of the detergent mixture and water; and slowing down the emulsification rate of the detergent mixture, so as to render the liquid composition effective for extinguishing a coal fire, and without generation of gases toxic to humans. The liquid composition that is preferred for use in the method of extinguishing a coal fire according to the invention consists essentially of the detergent mixture, vitamin B-6, bicarbonate of soda, water, and non-toxic coloring and perfuming agents if desired. More specifically, the formulation preferably comprises a mixture of: the detergent mixture which comprises about 50% by volume of the formulation; vitamin B-6 in the amount of about 0.5–3% by weight of the detergent mixture; bicarbonate of soda in the amount of about 3–18% by weight of the detergent mixture; and water comprising about 37–47% by volume of the total formulation to a non-toxic coloring agent is utilized, preferably red vegetable color, it is utilized in the amount of about 0.25–0.75% by weight of the detergent mixture. When a non-toxic perfuming agent is utilized, such as eucalyptus oil, it is preferably utilized in the amount of about 1–2% by weight of the detergent mixture.

The formulation according to the invention can be used in coal firefighting applications of all types. For instance it can be used in deep mines by direct manual hose lines, deep mines with fixed sprinkler systems, penetration of currently closed mines by boring holes therein and pumping the agent into the bore holes, and underground fires involving packed or graded areas, and coal piles either binned or open and awaiting use or shipment, in rail or sea operation where spontaneous ignition has occurred or must be prevented, and on tire dump sites. Maximum utility is achieved when the detergent mixture comprises (by volume) about 10–40% LAS, about 2–12% IP, about 0–5% PSM, about 2–10% LD, about 0–2% MS, and about 31–86% water. (LAS is linear alkylbenzene sulfonate, IP is isoocytylphenyl polyethoxyethanol, PSM is polyoxyethylene sorbitan monooleate, LD is lauric diethanolamide, and MS is monoethanolamide superamide). LAS, LD, and MS are solids that must be brought to a liquid with heat, and IP and PSM are then added hot or cold, depending upon the desired effect. The temperature range for making the prime chemical is from about 125°–200° F. and the differences in temperature also can change the characteristics of the chemical. Thus, pH, viscosity, surface tension, and specific gravity can be changed at will depending upon the particular proportion of the components of the detergent mixture, and can be slightly different.

For most applications, where the formulation is metered to the fire at about 6–10% dilution rate to water, the most desirable proportion of the components are: the detergent mixture comprising (by volume) 33% LAS, 6% IP, 3% PSM, 6% LD, 2% MS, and 50% water (this is referred to hereafter in the specification as "the specific detergent mixture"), the detergent mixture itself comprising 50% by volume of the total formulation; bicarbonate of soda 8%; vitamin B-6½%; red vegetable color about 0.5%; and water comprising the rest of the formulation.

According to the invention, it is highly desirable to use red dye in the formulation. The red dye is used as an indicator to tell the firefighters when an area has been extinguished so that they can move on further down in the coal mine tunnel or shaft. The red dye is provided in an amount effective to cause a red colored light to be reflected when a light source is directed onto the coal surface when the coal to which the agent has been applied is no longer burning. When the firefighters see the red reflected light, they proceed further to other areas. Thus according to the invention a method of fighting a fire is provided which comprises the steps of: (a) Applying directly to the burning coal a liquid composition containing a mixture of: a linear alkylbenzolyate sulfonate, non-ionic detergent and lauric superamide detergent mixture; vitamin B-6; bicarbonate of soda; water; and red dye so as to put out fire without generation of gases toxic to humans; (b) Directing a light on portions of the coal to which the liquid composition has been applied; (c) Detecting the reflection of the light off of the coal to which the liquid composition has been applied; and (d) Proceeding past the area upon which the light has been directed once there is a reflection of red colored light, provided by the red dye, from that area.

Utilizing the formulation according to the present invention, it is also possible to practice methods of absorbing methane and other gases generated by a fire, and retarding spontaneous ignition of coal.

That is, according to the present invention a method of absorbing gases generated by a coal burning fire, including methane, is provided comprising the step of spraying into the air in the area where the gases are present, metered with water, a formulation comprising a mixture of a linear alkylbenzolyate sulfonate, non-ionic detergent and lauric superamide detergent mixture; vitamin B-6 bicarbonate of soda; and water. This method is practiced by metering the liquid formulation at about a 0.25–0.5% dilution rate to water. The finer the spray, the more quickly the absorbing action will take place. The formulation absorbs $CO_2$, CO, $NO_2$, and $SO_2$. This gas absorbing function inherently takes place when the formulation according to the invention is used in firefighting, methane and like gases being absorbed as generated.

According to the invention there is also provided a method of retarding spontaneous ignition of coal comprising the steps of: (a) providing a liquid composition comprising a mixture of linear alkylbenzolyate sulfonate, non-ionic detergent and lauric superamide detergent mixture; vitamin B-6; bicarbonate of soda; and water; and (b) spraying the liquid composition, metered with water, onto the coal surface area at which it is desired to retard spontaneous ignition. For this method, the liquid formulation is metered at about a 0.5–1.5% dilution rate to water. Spontaneous ignition will be prevented indefinitely as long as no significant increase in temperature or pressure results.

When used for firefighting, the liquid composition is applied as a water additive at a rate of application of about 6–10% to water. For application against hot mine surfaces where there is little open flame, a 6% metering rate is sufficient, while for coal faces that have an open flame and high pressure, a 10% metered rate is sufficient. Fire gases will be dispelled in both situations. For tunnel areas with smoke and heat from hot walls etc., and no open flame, 3% metering of agent to water is preferred. For mine entrance areas or just outside mine entrances, 3% metering of agent to water is preferred.

Application is best by a disperse spray of about 9–125 gallons per minute covering the surfaces of the affected areas, although a straight stream may be used in some circumstances. Nozzle pressure should typically be about 50–90 psi. For closed mine operation, the liquid composition is mixed to water at a 6–10% rate, and can be injected through bore holes in the top of the mine with an injection pipe placed down into the mine cavity. A deflector may be installed on the bottom end of the pipe to cause faster break above the stream as it enters the mine cavity.

EXAMPLE I

For 4.1 pounds of the specific detergent mixture described above, 1% by weight eucalyptus oil, 8% by weight bicarbonate of soda, and 0.5% by weight vitamin B-6 were mixed with water. After thorough mixing, the detergent mixture and 0.25% by weight red vegetable color were added, and mixing continued until a homogeneous liquid composition was produced. The liquid composition was sprayed directly on the faces of a mine tunnel in a coal mine that was on fire, and successfully extinguished the fire in the treated area of the mine tunnel.

EXAMPLE II

Four different tests were conducted to determine the amount of agent that was desirable to use in extinguishing a coal fire, and to compare the results of using the agent according to the invention with the results using water, and water and foam. The "agent" utilized in these tests was the preferred agent described above, in which the detergent mixture comprised 33% LAS, 6% IP, 3% PSM, 6% LD, 2% MS, and 50% water, the detergent mixture itself comprising about 50% by volume of the total formulation and the total formulation also including about 8% by weight of the detergent mixture of bicarbonate of soda, about 0.5% by weight of the total detergent mixture of vitamin B-6, about 0.5% vegetable coloring, and about 1% eucalyptus oil, and the remainder water.

Test Equipment, Test #s 1 and 3:

A 55 gallon drum was split lengthways and the edges turned out. The drum was then turned horizontally and a quarter-inch steel grate placed inside, approximately eight inches from the bottom. One inch of water and six inches of diesel fuel were loaded under the grate. Coal was then placed on the top of the grate.

Test Equipment, Test #s 2 and 4:

A 20 square foot pan with four-inch sides was used. The pan has legs attached and stands four inches off the ground. Each leg is equipped with adjusters so the pan may be leveled. Several steel grates with a ¼" space below were placed in the bottom of the pan to provide a good draught for the fire.

Test Procedures, Test #1:

The fuel was ignited with a little gasoline and allowed to burn until the coal pile was fully engulfed. Extinguishment was then recorded with all the data as follows.

Test Procedures, Test #2

In excess of 1000 lbs. of coal was loaded in the pan on top of the grates. The coal was soaked in 5 gls. of kerosene for four hours prior to ignition. Just before ignition another 5 gls. of kerosene was poured over the coal and one cup of gasoline was used as a starter. The coal pile was ignited and was allowed to burn for 25 hours prior to extinguishment.

Test Procedures, Test #3

Almost 1200 lbs. of coal were placed in the pan and soaked in five gallons of kerosene. About 20 hours later the pile was ignited with a small amount of gasoline. The fire was checked throughout the night an into the early hours of the next day.

Test Procedures, Test #4

1200 lbs. of coal was placed in a pan on top of grates. 18 gallons of kerosene was poured into the pan and at 1000 hours with about a gallon of gasoline as a starter fuel the fire was ignited. The coal was allowed to burn for 25 hours to reach the temperature desired before the extinguishment process was started.

FIRE INFORMATION CHART #1

| Test nr. | 1 | 2 | 3 | 4 |
|---|---|---|---|---|
| (1) Fuel Type | Stove Coal | Anthracite | Anthracite | Anthracite |
| a. Amount | 300 Lbs. | 1200 Lbs. | 1200 Lbs | 1200 Lbs |
| b. BTU Output per LB | 11,000 | 13,200 | 13,200 | 13,200 |
| c. BTU Output per Hr | 133,650 | 580,000 | 523,072 | 580,000 |
| d. Total BTU Cap. | 2,475,000 | 13,200,000 | 13,200,000 | 13,200,000 |
| (2) Starter Fuel Type | Diesel | Kerosene | Kerosene | Kerosene |
| a. Amount | 13 Gal | 10 Gal | 5 Gal | 18 Gal |
| b. BTU Output per LB | 22,000 | 23,000 | 23,000 | 23,000 |
| c. Total BTU Output | 286,000 | 230,000 | 115,000 | 2,649,600 |
| (3) Coal Burn Time | 6.40 Hrs | 25 Hrs | 20 Hrs | 25 Hrs |
| (4) Ext. Start Time | 15.35 | 1730 | 1330 | 1120 |
| (5) Ext. Complete | 16.24 | 1900 | 1430 | 1220 |
| (6) Agent Type | Inventive Agent | Inventive Agent | AFFF (Foam) | Water |
| a. % to water | 10 | 6 | 6 | N/A |
| (7) Total Solution | 8.325 Gal | 30 Gal | 30 Gal | 30 Gal |
| a. Total agent used | .833 Gal | 1.8 Gal | 1.8 Gal | N/A |
| (8) Start Temperature | 1150° F. | 1450° F. | 1425° F. | 1450° F. |
| a. End Temperature | 150° F. | 116° F. | 750° F. | 1200° F. |
| (9) Agent Tank Size | 17 Gal | 17 Gal | 17 Gal | 17 Gal |
| a. Discharge System | Air | Air | Air | Air |
| b. Hose Size | 1" | 1" | 1" | 1" |
| c. Nozzle Size | ¾" | ¼" | Nat. Foam 2 GPM | ¼" |
| d. Nozzle Type | Straight Fog | Dispersed | Air Aspirated | Dispersed |
| (10) GPM | 2.7 | 2.9 | 2 | 2.9 |
| a. PSI | 10 | 5 | 100 | 5 |

THERMAL CONDUCTIVITY CHART #2:

| Test Nr. | 1 | 2 | 3 | 4 |
|---|---|---|---|---|
| Total BTU Capacity | 2,475,000 | 13,200,000 | 13,200,000 | 13,200,000 |
| BTU Hourly Emission Rate | 133,650 | 580,000 | 523,072 | 580,000 |
| Solution Heat Absorption Per Gl. Average | 14,272 | 19,333 | 9,590 | 8,333 |
| Den. Solution per lb. Coal | .236 | .255 | .450 | .569 |
| Density Per Cu/Ft | 22.9 | 24.74 | 43.65 | 55.19 |
| Metered Rate | 10% | 6% | 6% | N/A |
| Maximum, Agent BTU Absorption Cap. per lb. | 20,100 | 12,060 | 1,184 | 1,184 |
| Minimum, Agent BTU Absorption Cap per lb. | 245 | 235 | 180 | 180 |

| Total Heat Capacity Technical Data, Test #1*4 | | | | |
|---|---|---|---|---|
| LBS 6% Inventive Agent | BTU Absorbed | BTU Remaining | Deg. F. Remaining | Deg. F. Reduction |
| 40 | 482,400 | 1,517,600 | 758 | 242 |
| 40 | 482,400 | 1,035,200 | 518 | 240 |
| 20 | 241,200 | 794,000 | 397 | 121 |
| 20*1 | 31,066 | 762,934 | 381 | 16 |
| 20 | 30,368 | 732,566 | 366 | 15 |
| 20*2 | 29,160 | 703,406 | 351 | 15 |
| 40 | 56,096 | 647,310 | 323 | 28 |
| 40 | 53,345 | 593,965 | 296 | 27 |
| 40 | 51,030 | 542,935 | 271 | 25 |
| 40 | 49,124 | 493,811 | 246 | 25 |
| 40 | 47,497 | 446,314 | 223 | 23 |
| 20*3 | 23,272 | 423,041 | 211 | 12 |
| 20 | 3,600 | 419,941 | 209 | 2 |

*1In this particular fire calculation chart, the temperature has fallen just below the optimum boiling point of both the solute and water, so efficiency is reduced dramatically.
*2At this point in the chart the liquid capacity of the solute is below maximum specific heat.
*3At this point on the chart only the water in the solution will come to a near boil, the solute has lost almost all its specific heat.
NOTE: The remaining BTUs listed for this size fire does not present a heat-up process as the temperature of the pile is well below auto-ignition temperature.
*4A simulated fire to set up the math calculations.

Total Heat Capacity Technical Data on Test Fire #2

The fire test chart shows the average BTU/per hr. emissions rate based on the Stephan-Boltsmann constant, but does not show the total heat capacity of the fire. The total BTUs produced by the fire per hour includes surface emissions rate plus internal production or chemical reaction.

In the case of this fire of 1000 lbs. of coal at 1,450° F. it was 1,450,000 BTUs per hour. In the case of this fire due to the uniformity of the coal pile and its configuration it is easy to accommodate the calculations created by the extinguishment process with water and 6% inventive agent.

| LBS of Water % Inventive Agent at 6% | BTU Absorbed | BTU Remaining | Deg. F. Remaining | Deg. F. Reduced |
|---|---|---|---|---|
| 25.5 | 301,500 | 1,148,500 | 1,148 | 302 |
| 25.5 | 301,500 | 847,000 | 847 | 301 |
| 25.5 | 301,500 | 545,000 | 545 | 302 |
| 25.5*1 | 135,000 | 410,000 | 410 | 135 |
| 25.5 | 29,756 | 380,243 | 380 | 30 |
| 25.5 | 29,691 | 350,551 | 350 | 30 |
| 25.5 | 29,625 | 320,925 | 320 | 30 |
| 25.5 | 29,560 | 291,364 | 291 | 29 |
| 25.5 | 29,447 | 261,866 | 261 | 30 |
| 25.5*2 | 29,401 | 232,434 | 232 | 29 |

255 lbs.
30 Gal. of Solution
*2Actual temperature recorded by the thermocouple was 163° F. The variation in the calculations from the initial 25.5 or 3 gal. per minute to the final application was 69° F. The calculations listed above are within 95% of the actual recorded temperature.
*1The point at which inventive agent with water loses maximum efficiency is the temperature at which the chemical is at its optimum boiling point.

| Total Heat Capacity Technical Data on Test Fire #3 | | | | |
|---|---|---|---|---|
| LBS of Water & Foam At 6% | BTU Absorbed | BTU Remaining | Deg. F. Remaining | Deg. F. Reduction |
| 16.7 | 19,205 | 1,405,795 | 1,405 | 20 |
| 16.7 | 19,205 | 1,386,590 | 1,386 | 19 |

-continued

| Total Heat Capacity Technical Data on Test Fire #3 | | | | |
|---|---|---|---|---|
| LBS of Water & Foam At 6% | BTU Absorbed | BTU Remaining | Deg. F. Remaining | Deg. F. Reduction |
| 16.7 | 19,205 | 1,367,385 | 1,367 | 19 |
| 16.7 | 19,205 | 1,348,180 | 1,348 | 19 |
| 16.7 | 19,205 | 1,328,975 | 1,328 | 20 |
| 16.7 | 19,205 | 1,309,770 | 1,309 | 19 |
| 16.7 | 19,205 | 1,290,565 | 1,290 | 19 |
| 16.7*1 | 19,205 | 1,271,360 | 1,271 | 19 |
| 16.7 | 19,205 | 1,252,155 | 1,252 | 19 |
| 16.7 | 19,205 | 1,232,950 | 1,232 | 20 |
| 16.7 | 19,205 | 1,213,745 | 1,213 | 19 |
| 16.7 | 19,205 | 1,194,540 | 1,194 | 19 |
| 16.7 | 19,205 | 1,175,335 | 1,175 | 19 |
| 16.7 | 19,205 | 1,156,130 | 1,156 | 19 |
| 16.7*2 | 19,205 | 1,136,925 | 1,136 | 20 |

*1At the 16 gallon mark, foam and water together shows a temperature of 1,271° F. on the chart. The actual temperature as recorded by the thermocouple was 650° C., or 1,202° F., meaning that at the upper temperature the foam was responsible for a 69° F. drop over the chart.
*2At the end of discharge the actual recorded temperature was 750° F. The chart shows the temperature to be 1,136° F., a 386° difference. The foam was responsible for the additional drop in temperature. This infers that foam andwater have a slightly higher specific heat than water alone. The chart also indicates that foam has very little capacity to reduce heat at much above 1000° F. and only minimal ability to absorb heat at or below 1000° F.
NOTE: Because 750° F. is above the auto-ignition point of coal, an additional 15 gal. of water with 10% inventive agent was discharged on the fire in 30 seconds. One minute later the temperature of the fire was at 175° F. to extinguish the fire completely.

| COMPARISON OF PROPERTIES OF WATER AND INVENTIVE AGENT | Water | Inventive Agent |
|---|---|---|
| Density (lbs/gl.) | 8.35 | 8.50 |
| Specific Gravity (gr/cm) | 1.00 | 1.05 |
| Viscosity (cps) at 60° F. | 1.00 | 250 |
| Heat of Formation (BTU/lb.) | 180 | 235 |
| Specific Heat of Solution (BTU/lb.) | 1.00 | 2.18 |
| Solute Boil Temp (°F.) | 212 | 425 |
| Heat of Fusion (BTU/lb.) | 80 | 174 |
| Latent Heat of Vaporization (BTU/lb.) | 970 | 231,000 |

From the above, it will be seen that the curve of FIG. 1 may be plotted, indicating the great superiority of the inventive agent in fighting coal fires, compared to water and water with foam. Testing has also shown the inventive agent to penetrate the coal down to about 5 inches, and to breakdown the unburned products of combustion and all fire gases which derive from the coal including methane. The invention also has been shown not to produce any toxic gases so that it is safe for use even in coal mines and other confined areas, and has been approved for use in fighting fires in coal mines by the Bureau of Mines.

While the invention has been shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent formulations and methods.

What is claimed is:

1. A formulation for use in extinguishing coal fires, without generation of substantial gases toxic to humans, for metering to the fire at about a 6-10 percent dilution rate to water, the formulation consisting essentially of a mixture of:

a linear alkylbenzolyate sulfonate, non-ionic detergent and lauric superamide detergent mixture comprising about 50 percent by volume of the formulation;

vitamin B-6 in the amount of about 0.5–3 percent by weight of the detergent mixture;

bicarbonate of soda in the amount of about 3–18 percent by weight of the detergent mixture; and water comprising about 37–47 percent by volume of the total formulation.

2. A method of extinguishing a coal fire comprising the step of:

applying directly to the burning coal a liquid composition consisting essentially of a detergent mixture of linear alkylbenzolyate sulfonate, non-ionic detergent and lauric superamide and water, with effective amounts of materials for: densifying and increasing the heat absorption capability of the detergent mixture and water; and slowing down the emulsification rate of the detergent mixture, so as to render the liquid composition effective for extinguishing a coal fire, and without generation of gases toxic to humans.

3. A formulation for extinguishing coal fueled fires and disbursing fire gases, consisting of: a linear alkylbenzolyate sulfonate, non-ionic detergent and lauric superamide detergent mixture; vitamin B-6; bicarbonate of soda; water; optionally perfuming agents; and red dye in an amount effective to cause a red colored light reflection when coal to which the formulation has been applied is no longer burning, providing an indication that it is safe to proceed past the red colored reflecting light.

4. A method of fighting a coal fueled fire comprising the steps of:

(a) applying directly to the burning coal a liquid composition consisting essentially of a mixture of: a linear alkylbenzolyate sulfonate, non-ionic detergent and lauric superamide detergent mixture; vitamin B-6; bicarbonate of soda; water; and red dye so as to put out the coal fueled fire without generation of gases toxic to humans;

(b) directing a light on portions of the coal to which the liquid composition has been applied;

(c) detecting the reflection of the light off of the coal to which the liquid composition has been applied; and (d) proceeding past the area upon which the light has been directed once there is a reflection of red colored light, provided by the red dye, from that area.

5. A formulation as recited in claim 1 consisting essentially of the detergent mixture, vitamin B-6, bicarbonate of soda, and water, with non-toxic coloring and perfuming agents.

6. A formulation as recited in claim 5 wherein the coloring is red vegetable color in an amount of about 0.25–0.75 percent by weight of the detergent mixture.

7. A formulation as recited in claim 6 wherein said non-toxic perfuming agent includes eucalyptus oil in an amount of about 1–2 percent by weight of the detergent mixture.

8. A formulation as recited in claim 6 wherein the detergent mixture comprises, by volume, about 10–40% linear alkybenzene sulfonate; about 2–12% isooctylphenyl polyethoxyethanol; about 0–5% polyoxyethylene sorbitan monooleate; about 2–10% lauric diethanolamides; about 0–2% monoethanolamide superamides; and about 31–86% water.

9. A formulation as recited in claim 8 wherein the detergent mixture comprises about 33% linear alkybenzene sulfonate; about 6% isooctylphenyl polyethoxyethanol; about 3% polyoxyethylene sorbitan monooleate; about 6% lauric diethanolamides; about 2% monoethanolamide superamides; and about 50% water, and wherein the detergent mixture comprises about 50% by volume of the formulation, and wherein the formulation also consists essentially of about 8% bicarbonate of soda, about ½% vitamin B-6 by weight of the detergent mixture, between about 0.25–0.75% red vegetable color by weight of the detergent mixture, and the remainder water.

10. A method as recited in claim 2 wherein said applying step is practiced by spraying the liquid composition directly onto the burning coal.

11. A method as recited in claim 10 wherein said applying step is practiced by mixing the detergent mixture so that it is about 50% by volume of the liquid composition, and consists essentially of bicarbonate of soda in the amount of about 3–18% by weight of the detergent mixture, vitamin B-6 in the amount of about 0.5–3% by weight of the detergent mixture, and about 37–47% by volume water; and the method is further practiced by adding the liquid composition to water prior to spraying onto the burning coal to provide a dilution rate of about 6–10% to water.

12. A method as recited in claim 2 for use in a closed coal mine, and wherein the applying step is practiced by placing an injection pipe in a bore hole leading to the burning coal in the mine, providing a deflector at the bottom of the pipe and injecting the liquid composition down the pipe so that it impacts the deflector and sprays onto the burning coal.

13. A method as recited in claim 2 wherein said applying step is practiced by first mixing the detergent mixture with other components to provide a composition consisting essentially of linear alkylbenzolyate sulfonate, non-ionic detergent and lauric superamide detergent mixture; bicarbonate of soda; vitamin B-6; water; non-toxic red dye; and, if desired, non-toxic perfuming agents.

14. A method as recited in claim 13 wherein the mixing step is practiced by providing as constituents of the detergent mixture about 10–40% linear alkybenzene sulfonate; about 2–12% isooctylphenyl polyethoxyethanol; about 0–5% polyoxyethylene sorbitan monooleate; about 2–10% lauric diethanolamides; about 0–2% monoethanolamide superamides; and about 31–86% water.

15. A formulation as recited in claim 3 consisting of detergent mixture in an amount of about 50%, vitamin B-6 in an amount of about 0.5–3% by weight of the detergent mixture, bicarbonate of soda in an amount of about 3–18% by weight of the detergent mixture, water in an amount of about 37–47% by volume of the formulation, and red dye in an amount of about 0.25–0.75% by weight of the detergent mixture.

16. A formulation as recited in claim 3 wherein the red dye comprises red vegetable color.

17. A formulation as recited in claim 16 wherein the detergent mixture comprises about 10–40% linear alkybenzene sulfonate; about 2–12% isooctylphenyl polyethoxyethanol; about 0–5% polyoxyethylene sorbitan monooleate; about 2–10% lauric diethanolamides; about 0–2% monoethanolamide superamides; and about 31–86% water.

18. A formulation as recited in claim 15 wherein the detergent mixture comprises about 10–40% linear alkybenzene sulfonate; about 2–12% isooctylphenyl polyethoxyethanol; about 0–5% polyoxyethylene sorbitan monooleate; about 2–10% lauric diethanolamides; about 0–2% monoethanolamide superamides; and about 31–86% water.

19. A method as recited in claim 4 wherein step (a) is practiced by producing and utilizing a formulation consisting essentially of a detergent mixture in an amount of about 50%, vitamin B-6 in an amount of about 0.5–3% by weight of the detergent mixture, bicarbonate of soda in an amount of about 3–18% by weight of the detergent mixture, water in an amount of about 37–47% and red dye in an amount of about 0.25–0.75% by weight of the detergent mixture.

20. A method as recited in claim 19 wherein step (a) is further practiced by providing in the detergent mixture, by volume: about 10–40% linear alkybenzene sulfonate; about 2–12% isooctylphenyl polyethoxyethanol; about 0–5% polyoxyethylene sorbitan monooleate; about 2–10% lauric diethanolamides; about 0–2% monoethanolamide superamides and about 31–86% water.

21. A method of absorbing gases generated by a coal burning fire, including methane, comprising the step of spraying into the air in the area where the gases are present, metered with water, a formulation consisting essentially of a mixture of a linear alkylbenzolyate sulfonate, non-ionic detergent and lauric superamide detergent mixture; vitamin B-6; bicarbonate of soda; and water.

22. A method as recited in claim 21 wherein the spraying step is accomplished by metering the formulation at about a 0.25–0.5% dilution rate to water.

23. A method as recited in claim 22 wherein said spraying step is accomplished by first mixing as a formulation a mixture of the detergent mixture, comprising about 50% by volume of the formulation; vitamin B-6 in an amount of about 0.5–3% by weight of the detergent mixture; bicarbonate of soda in the amount of about 3–18% by weight of the detergent mixture; and water comprising about 37–47% by volume of the total formulation.

24. A method as recited in claim 23 wherein the formulation consists of the detergent mixture, vitamin B-6, bicarbonate of soda, water, and non-toxic coloring and perfuming agents if desired, and wherein the detergent mixture comprises, by volume: about 10–40% linear alkybenzene sulfonate; about 2–12% isooctylphenyl polyethoxyethanol; about 0–5% polyoxyethylene sorbitan monooleate; about 2–10% lauric diethanolamides; about 0–2% monoethanolamide superamides; and about 31–86% water.

25. A method of retarding spontaneous ignition of coal comprising the steps of:

(a) providing a liquid composition consisting essentially of a mixture of linear alkylbenzolyate sulfonate, non-ionic detergent and lauric superamide detergent mixture; vitamin B-6, bicarbonate of soda; and water; and (b) spraying the liquid composition, metered with water, onto the coal surface area at which it is desired to retard spontaneous ignition.

26. A method as recited in claim 25 wherein step (b) is practiced by metering the liquid composition at about a 0.5–1.5% dilution rate to water.

27. A method as recited in claim 26 wherein step (a) is further practiced by providing as the liquid composition the detergent mixture comprising about 50% by volume of the formulation; vitamin B-6 in the amount of about 0.5–3% by weight of the detergent mixture; bicarbonate of soda in the amount of about 3–18% by weight of the detergent mixture; water comprising about 37–47% by volume of the total formulation; and non-toxic coloring and perfuming agents, if desired.

28. A method as recited in claim 27 wherein step (a) is further practiced by providing as the detergent mixture, by volume: about 10–40% linear alkybenzene sulfonate; about 2–12% isooctylphenyl polyethoxyethanol; about 0–5% polyoxyethylene sorbitan monooleate; about 2–10% lauric diethanolamides; about 0–2% monoethanolamide superamides; and about 31–86% water.

29. A formulation according to claim 1 in combination with water wherein the formulation is in a 6–10 percent dilution rate to water.

* * * * *